(12) United States Patent
Yatabe et al.

(10) Patent No.: US 8,180,198 B2
(45) Date of Patent: May 15, 2012

(54) PLAYLIST CREATING APPARATUS AND METHOD, AND DUBBING LIST CREATING APPARATUS AND METHOD

(75) Inventors: Yusuke Yatabe, Yokohama (JP); Hironori Komi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 867 days.

(21) Appl. No.: 11/054,775

(22) Filed: Feb. 9, 2005

(65) Prior Publication Data

US 2006/0017980 A1    Jan. 26, 2006

(30) Foreign Application Priority Data

Jul. 21, 2004    (JP) .................. 2004-212452

(51) Int. Cl.
*G11B 27/00*    (2006.01)
*H04N 5/93*    (2006.01)
(52) U.S. Cl. .............. 386/290; 369/30.08; 386/282
(58) Field of Classification Search .............. 386/46, 386/290, 282; 369/30.08
See application file for complete search history.

(56) References Cited

U.S. PATENT DOCUMENTS

| | | | |
|---|---|---|---|
| 6,463,426 B1 * | 10/2002 | Lipson et al. | 707/3 |
| 2001/0018858 A1 * | 9/2001 | Dwek | 84/609 |
| 2002/0105541 A1 * | 8/2002 | Endou et al. | 345/738 |
| 2002/0127001 A1 * | 9/2002 | Gunji et al. | 386/124 |
| 2004/0028379 A1 * | 2/2004 | Ozaki | 386/68 |
| 2006/0230334 A1 * | 10/2006 | Slawson et al. | 715/500.1 |

FOREIGN PATENT DOCUMENTS

| | | |
|---|---|---|
| JP | 2002-100161 A | 4/2002 |
| JP | 2004-062921 | 2/2004 |

* cited by examiner

*Primary Examiner* — Thai Tran
*Assistant Examiner* — Girumsew Wendmagegn
(74) *Attorney, Agent, or Firm* — Kilpatrick Townsend & Stockton LLP

(57) ABSTRACT

A playlist creating apparatus is provided which allows a user to select desired digital images from a plurality of programs and use the desired digital images to simply create a playlist or to select a digital image in dubbing it to another recording medium. One image data that agrees in terms of a specific condition with another image data selected from recorded image data is added to an image screen as a selective candidate for display.

16 Claims, 9 Drawing Sheets

PLAYLIST CREATING APPARATUS AND METHOD, AND DUBBING LIST CREATING APPARATUS AND METHOD

This application claims the benefit of priority of Japanese Application No. 2004-212452 field Jul. 21, 2004, the disclosure of which also is entirely incorporated herein by reference.

BACKGROUND

The present invention relates to digital recorders capable of recording digital images as in TV broadcasting in an HDD or a DVD, and particularly to a digital recorder capable of creating a playlist.

There have been increased users who save a large quantity of digital images (e.g., programs) in a recording medium for enjoyment because of the larger capacity of the medium in recent HDD recorders. In this case, the user can create a playlist and selectively reproduce only his or her favorite programs. The user can also dub his or her favorite digital images in other recording media for save. However, creating a playlist from a plurality of digital images or saving these images in other recording media currently requires the user to select every single digital image that he or she desires. It is expected that such a task may require much time and labor because of increased digital images along with the further increased capacity of recording media.

A recording and reproducing apparatus (described in Japanese Patent Laid-open No. 2004-62921) is available as one means for solving the above problem. The above reference describes a technique for extracting a program that coincides in conditions such as the same time zone with the program that the user has selected from a plurality of programs recorded in a recording medium.

SUMMARY

However, the above reference describes a technique for extracting a program that coincides in conditions such as the same time zone with the program the user has selected, whereas it does not consider how to display a relevant retrieved program from a recording medium or how the user handles the program. An object of the present invention is to provide a playlist creating apparatus that allows a user to select desired digital images from a plurality of programs and use the digital images to create a simple playlist or to select digital images to be dubbed to another recording medium.

According to an aspect of the present invention, there is provided a digital image recording and reproducing apparatus that is random accessible. This apparatus includes an output module which displays a digital image recorded in a recording medium and information concerning the digital image on the display module; and a control module which selects a digital image, based on the information concerning the digital image recorded in the recording medium; wherein the control module selects a digital image that corresponds to information concerning a digital image specified by a user, from digital images recorded in the recording medium, and adds information showing the selected digital image to the display module through the output module for display.

The digital image recording and reproduction apparatus according to the invention can provide enhanced usability.

BRIEF DESCRIPTION OF THE DRAWINGS

These and other features, objects and advantages of the present invention will become more apparent from the following description when taken in conjunction with the accompanying drawing.

DETAILED DESCRIPTION OF PREFERRED EMBODIMENTS

Preferred embodiments of the present invention will be described below.

First Embodiment

Figure 1:
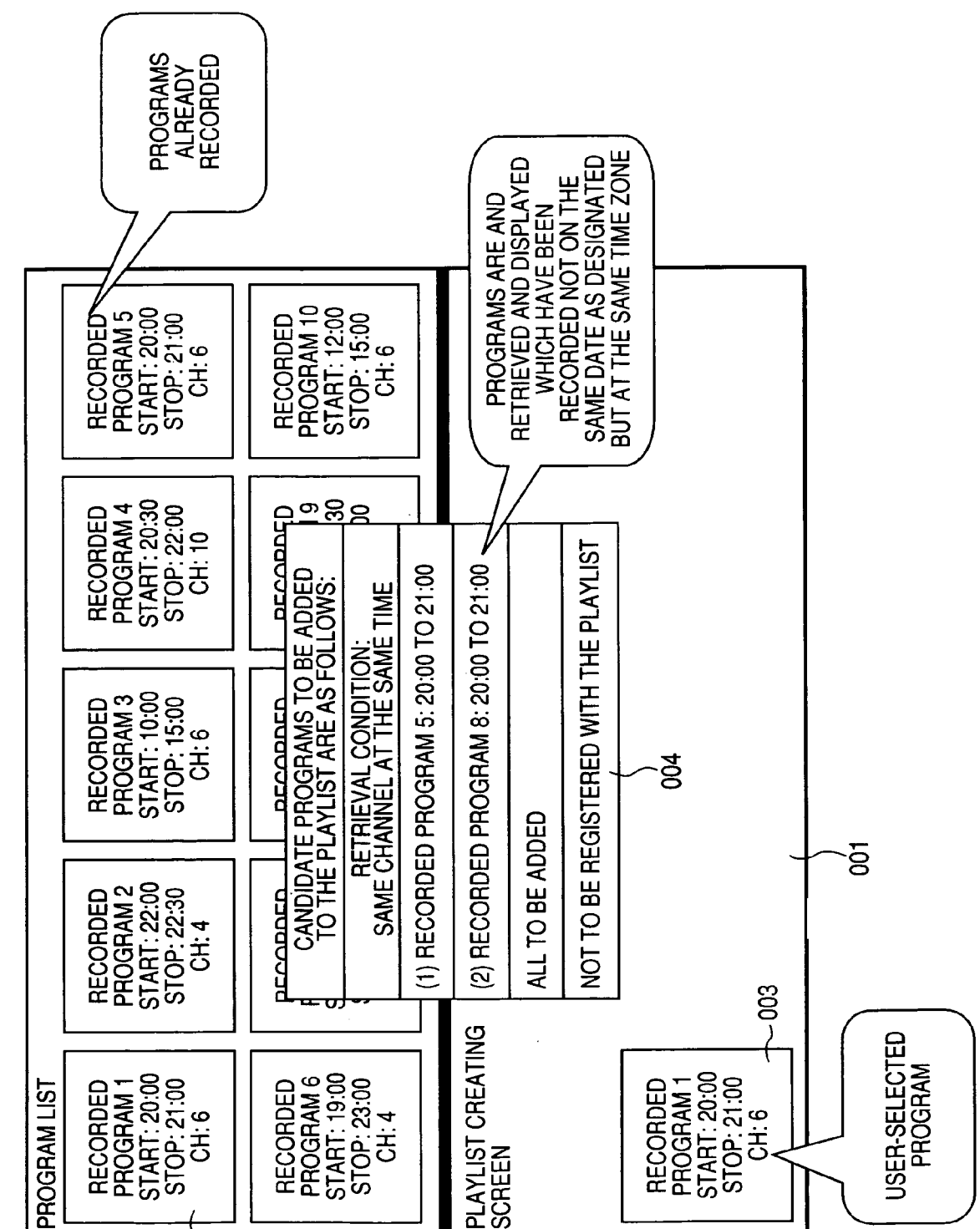
FIG. 1 is an imaginary diagram showing a program-selecting screen used in creating a playlist.

FIG. 1 exemplarily shows a program-selecting screen used in creating a playlist in accordance with the first embodiment. An area designated with reference numeral 001 shows a TV screen display area and programs designated with reference numeral 002 shows programs already recorded. n (While letters only are represented in FIG. 1, thumbnail images for still images and motion images and their related program titles, and date and time of recording, and channel information represented in letters are included.) In FIG. 1, programs 1 to 10 are recorded and then the associated information is displayed for each of the recorded programs 1 to 10. A region where the information on the recorded programs is also displayed is represented as a program list. A program designated with reference numeral 003 is a program selected by a user to create a playlist. In FIG. 1, the user has already selected recorded program 1. In addition, a region where the selected program is available is represented as a playlist-creating screen. Reference numeral 004 denotes a telop displayed on a display screen (i.e. a small frame displayed on a display screen in piles), which telop displays as candidate program to be added to a playlist a program meeting any of the conditions of a program that the user has selected from the program list for playlist creation. In this case, conditions used for retrieval and "not to be registered with the playlist" (to be cancelled) are also displayed.

Figure 2:
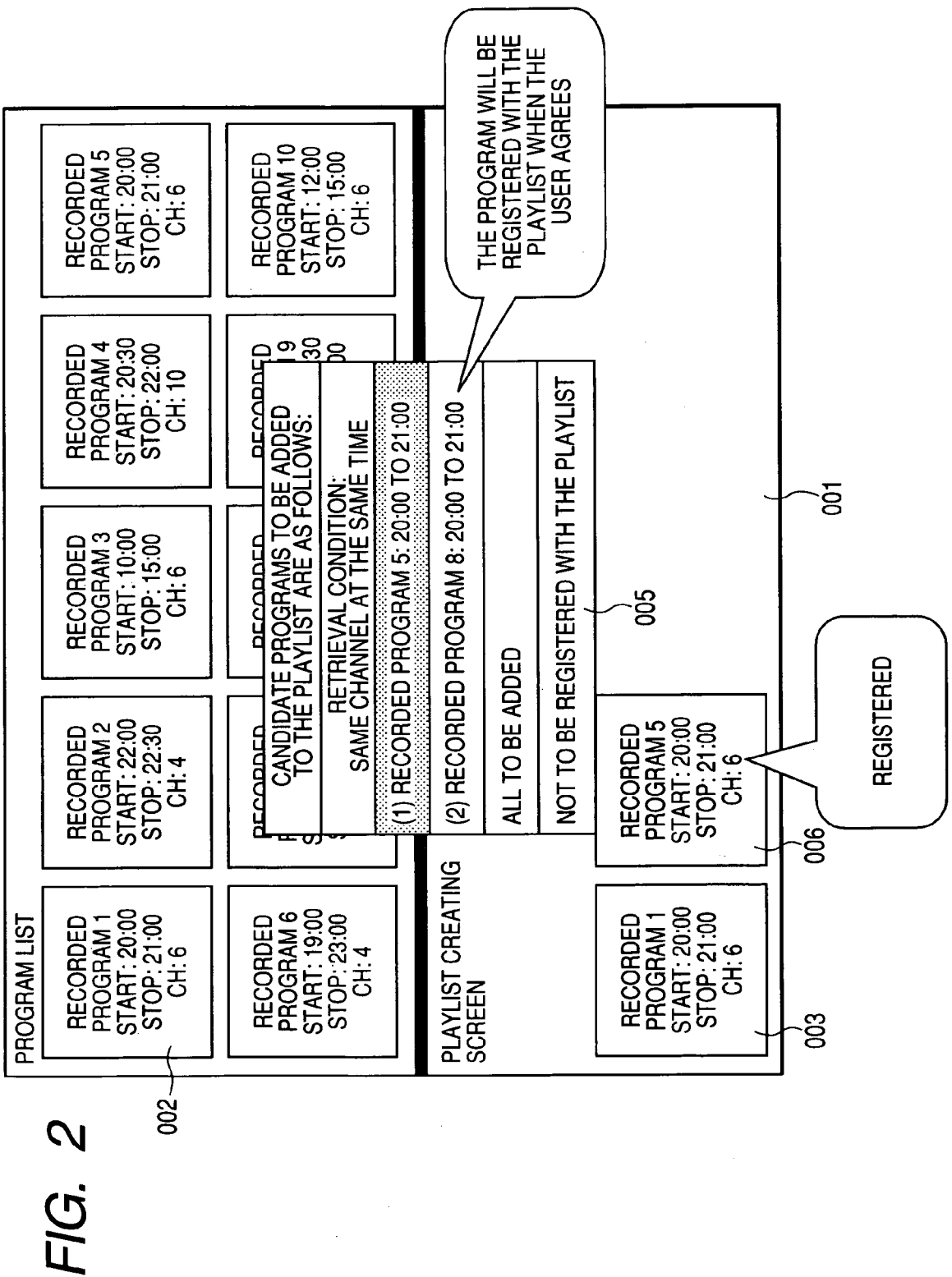
FIG. 2 is an imaginary diagram showing a playlist-selecting screen.

FIG. 2 shows a playlist-selecting screen according to the first embodiment. A telop designated with reference numeral 005 corresponds to the telop shown in FIG. 1. The user can add all of the candidate programs in the telop to the playlist, individually select and add any of these programs, or cancel any of these programs. When the user selects a first program (RECORDED PROGRAM 5:20 TO 21:00) in the telop, the program selected is registered with the playlist-creating screen and then displayed, for example, as a program designated with reference numeral 006.

Figure 3:
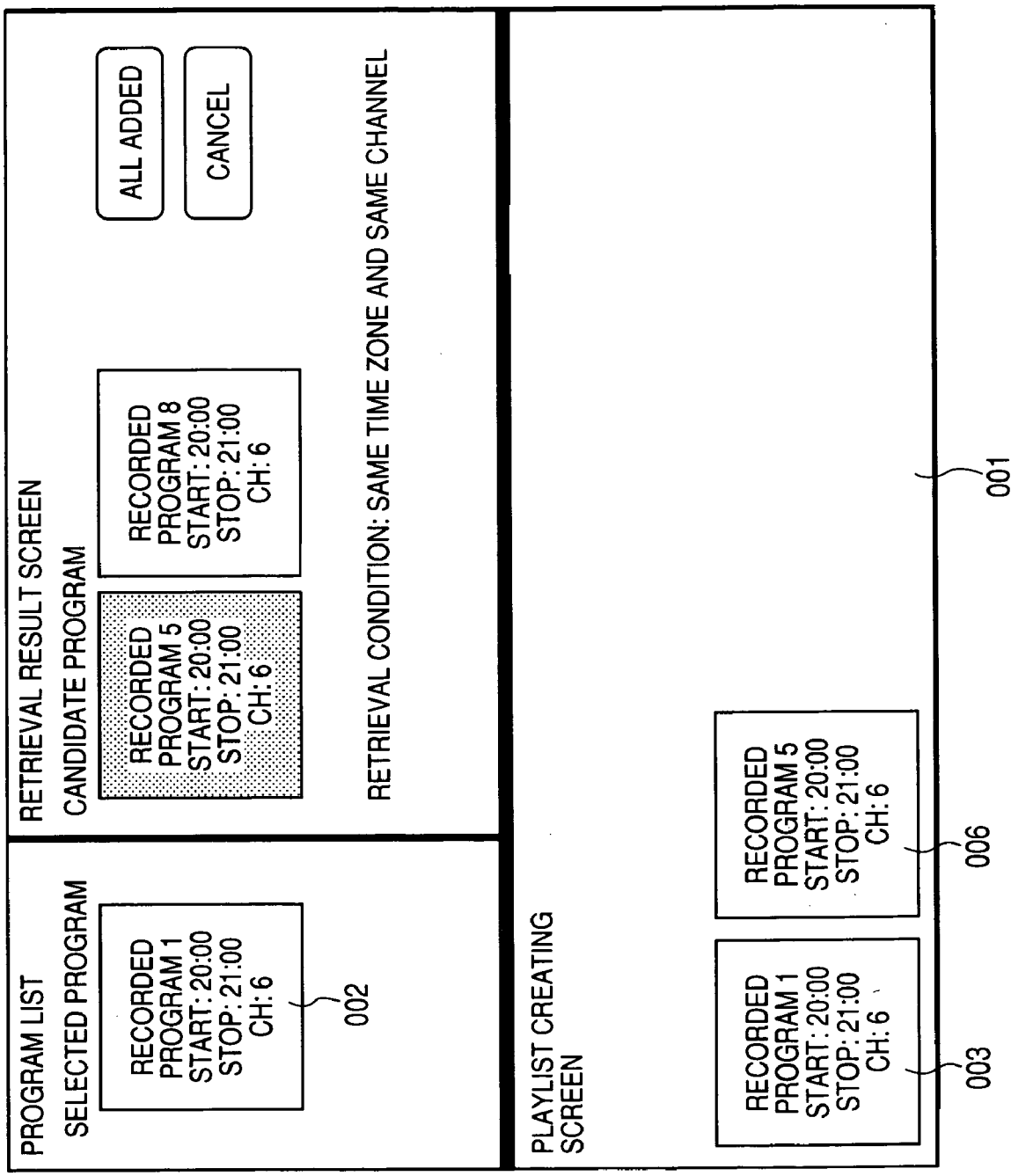
FIG. 3 is an imaginary diagram showing another playlist-selecting screen.

FIG. 3 shows another example of candidate programs for a playlist displayed when the user selects a desired program. In this example, a program that meets retrieval conditions for a program selected by the user is displayed in a still or motion image in a thumbnail in a region (named Retrieval Result Screen in FIG. 3) different from the program list and playlist-creating screen regions. The user can, on the Retrieval Result screen, make a selection, that is, add all of the candidate programs or only a desired candidate program to a playlist or cancel the mode. Because information on retrieved programs can be displayed in a thumbnail, usability is enhanced.

Figure 4:
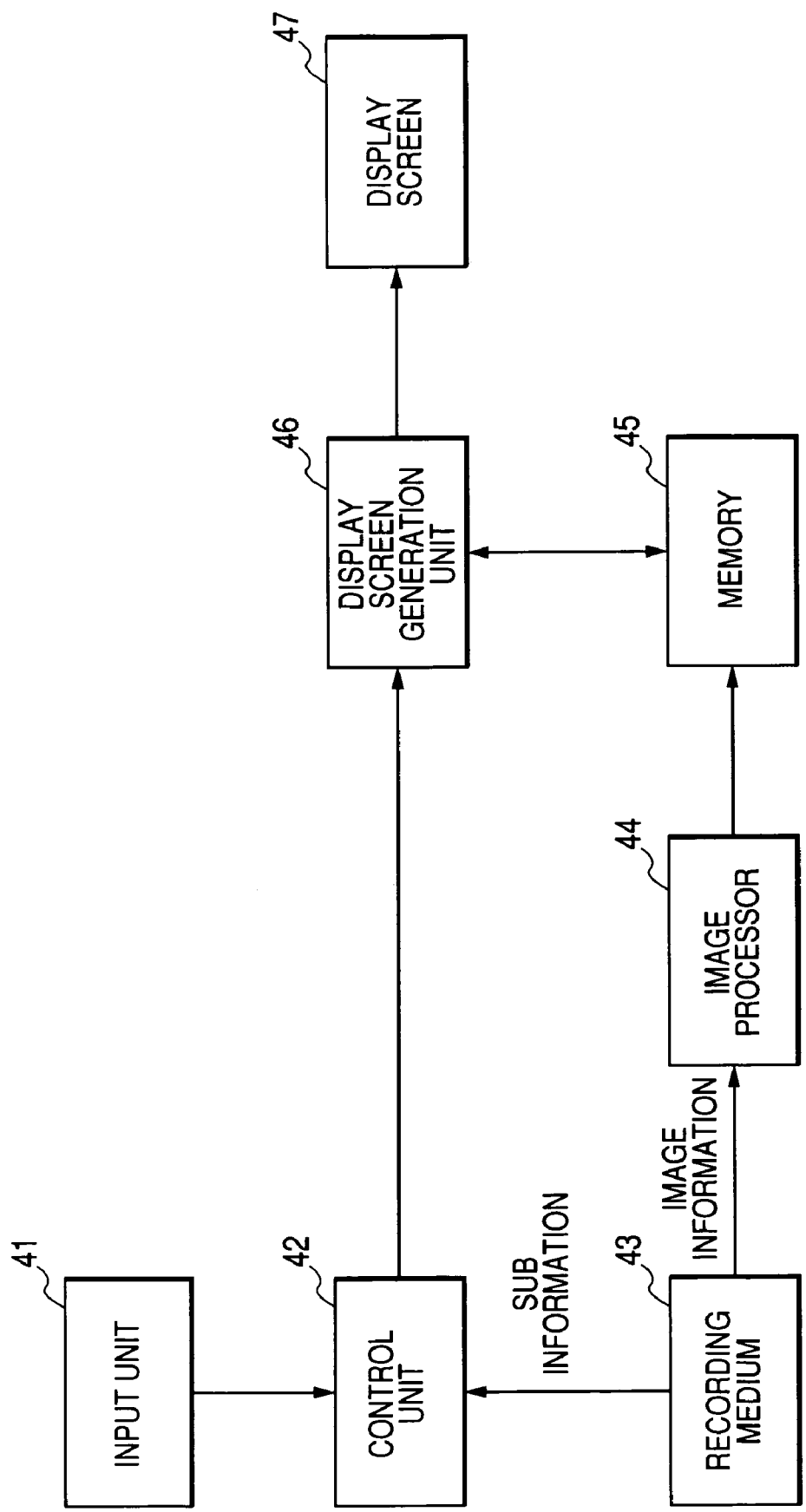
FIG. 4 is a block diagram showing a playlist-creating screen.

FIG. 4 shows a block diagram of a playlist-creating screen according to the first embodiment. It is assumed that information on a plurality of programs and their associated information (also called sub information) are already stored in a recording medium 43. When the user selects a program to be registered with a playlist from the plurality of programs, the input unit 41 sends the selection information to the control unit 42. The control unit 42 retrieves information associated with the other programs stored in the recording medium, based on associated information on the user-selected program and retrieval conditions, so as to select a program candidate. A playlist creating screen is previously saved in the memory 45. The associated information on the candidate program selected by the control unit 42 is added as a telop to the playlist-creating screen and displayed on a display screen 47. Control unit 42 can also rearrange the candidate programs by any (or the other) conditions.

If, in addition, the candidate program is displayed in a thumbnail, any frame information (for a still-image thumbnail; information on a motion image at any position for a motion-image thumbnail) on the candidate program determined by the control unit 42 undergoes image extension processing by an image processor 44 and is saved in the memory 45. The frame information is added to the candidate program region on the playlist-creating screen, which has been in advance saved in the memory 45. In addition, when all retrieval sessions are finished, the resultant is displayed on the display screen 47.

Figure 5:
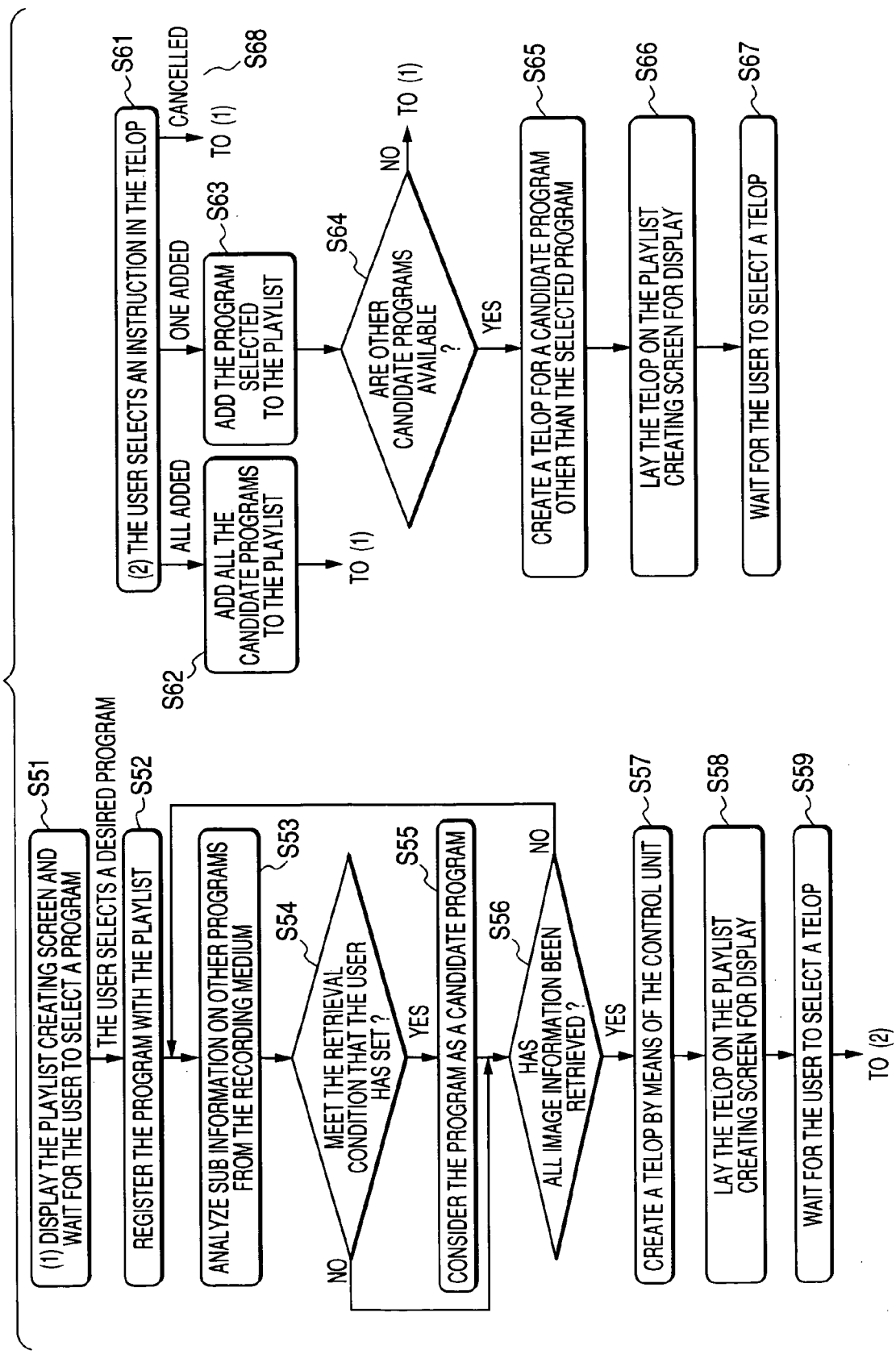
FIG. 5 is a flow chart for playlist creation processing.

FIG. 5 shows a flow chart for a playlist creation process. If, on the playlist-creating screen, the user selects a program to be added to a playlist, the selected program is first registered with the playlist (step S52). Based on associated information on the selected program, associated information on the other programs is then retrieved to check to see whether one of the other programs has a condition that is coincident with any of those of the selected program (step S53, S54). If the program has a coincident condition, the program is considered as a candidate program for a playlist (step S55). Otherwise, associated information on the next one of the other programs is then analyzed to see whether the program has such a coincident condition. This process is done until all of the other programs undergo the processing (step S56). After the retrieval of all of the other programs, the control unit picks up only candidate programs to create a telop (step S57), which is then added to the playlist creating screen for display (step S58). Control unit can also rearrange the candidate programs by any (or the other) conditions. The process then waits for the user to select a program in the telop (step S59). When the user then selects all programs to be added to the playlist from the telop (step S62), all of these candidate programs are registered with the playlist and the process returns to the playlist-creating screen. When the user selects any of the programs displayed (step S63), the program selected is registered with the playlist. If there is another candidate program, another telop is created and added to the playlist-creating screen for display and the process waits for the user to select a program in the telop (step S66, S67). If the user selects "To be cancelled," the display of the telop is stopped and the playlist-creating screen is displayed (step S68). The process then waits for the user to select a program.

Figure 6:
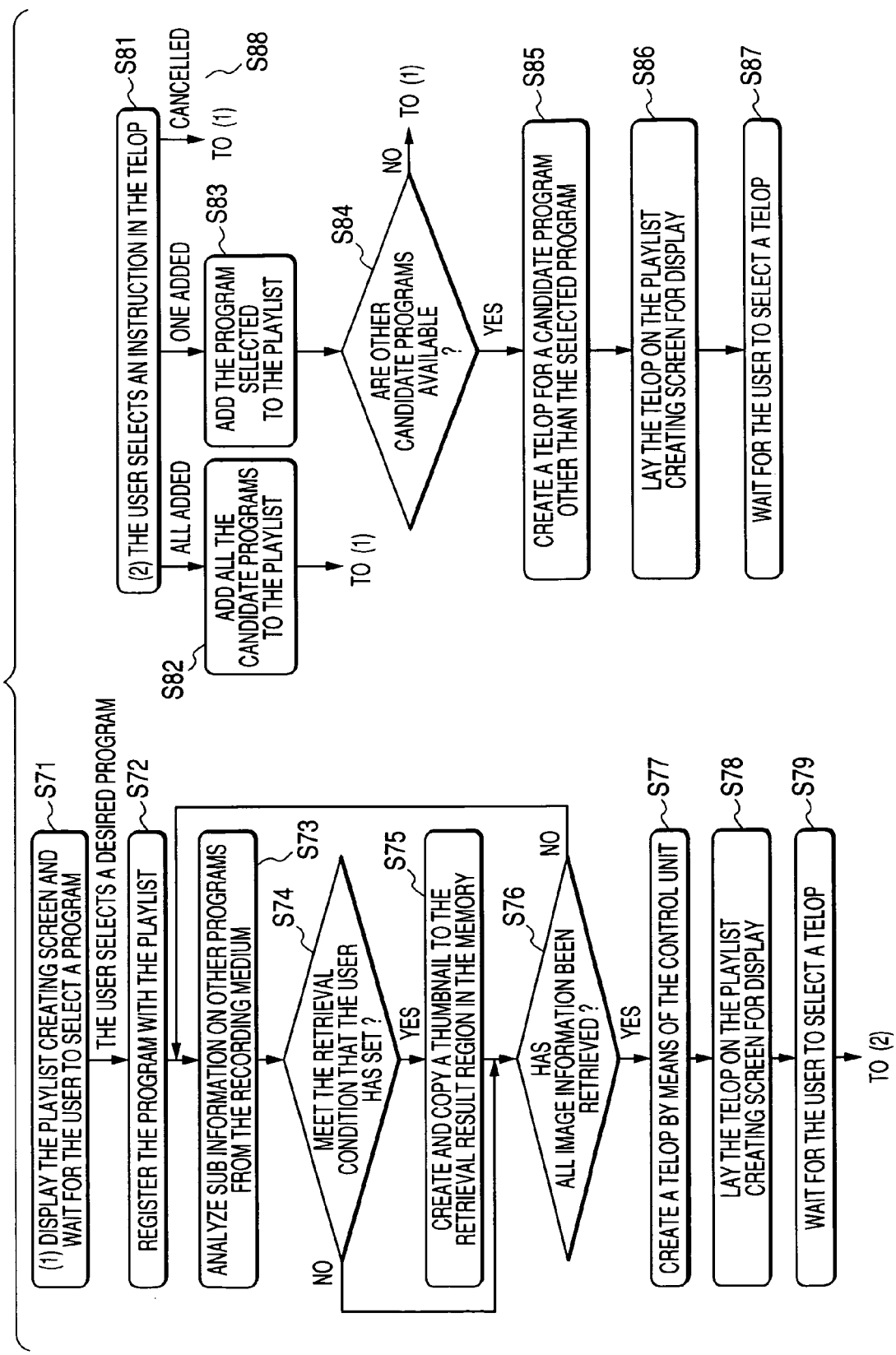
FIG. 6 is another flow chart for playlist creation processing.

FIG. 6 shows a flow chart for displaying a candidate program in a thumbnail. A technique for displaying a candidate program in a thumbnail is almost the same as that for displaying a candidate program in a telop. If, however, a candidate program is found, a still or motion image thumbnail for a program that is located at any position is pasted to a retrieval result region in the memory for display.

In the flow for the processing described above, a candidate program is retrieved based on associated information thereof. Instead of the associated information mentioned above, time of recording start, time of recording end, and a recording channel may be used to select from the recorded programs a program which has the same condition as the program selected by the user. When recording a desired program, the user may also record a title name of the program as well. The user then retrieve among the recorded programs a program having a title name with the same first few letters as those of the program selected when the user has created the playlist and uses it as a candidate to be added to the playlist. If information that the contents of a program belong to a series such as a sequel to a movie is added to a program stream recorded in various broadcastings and storage media, the information is recorded. When the user creates a playlist, a recorded program having the same series information as that of the recorded program selected by the user is retrieved among all the recorded programs for use as a candidate program to be added to the playlist.

Associated information that a user records along with a program record will be described below. When recording a program, the user records the time of recording start, time of recording end, time of program end, channel information, title name, and series-information data for a recorded program at the same time. To record such association information, time information is recorded in accordance with, e.g., the Video Recording Standard (VR Standard), in PL_CREATE_AT for the video manager information region. The other types of information are recorded in the test data manager region, which can be used freely by a user, and the manufacture's information table region. In addition, such association information may be recorded in a free format prepared in a way not compliant with the VR Standard in the same or a different recording medium.

Second Embodiment

Figure 7:
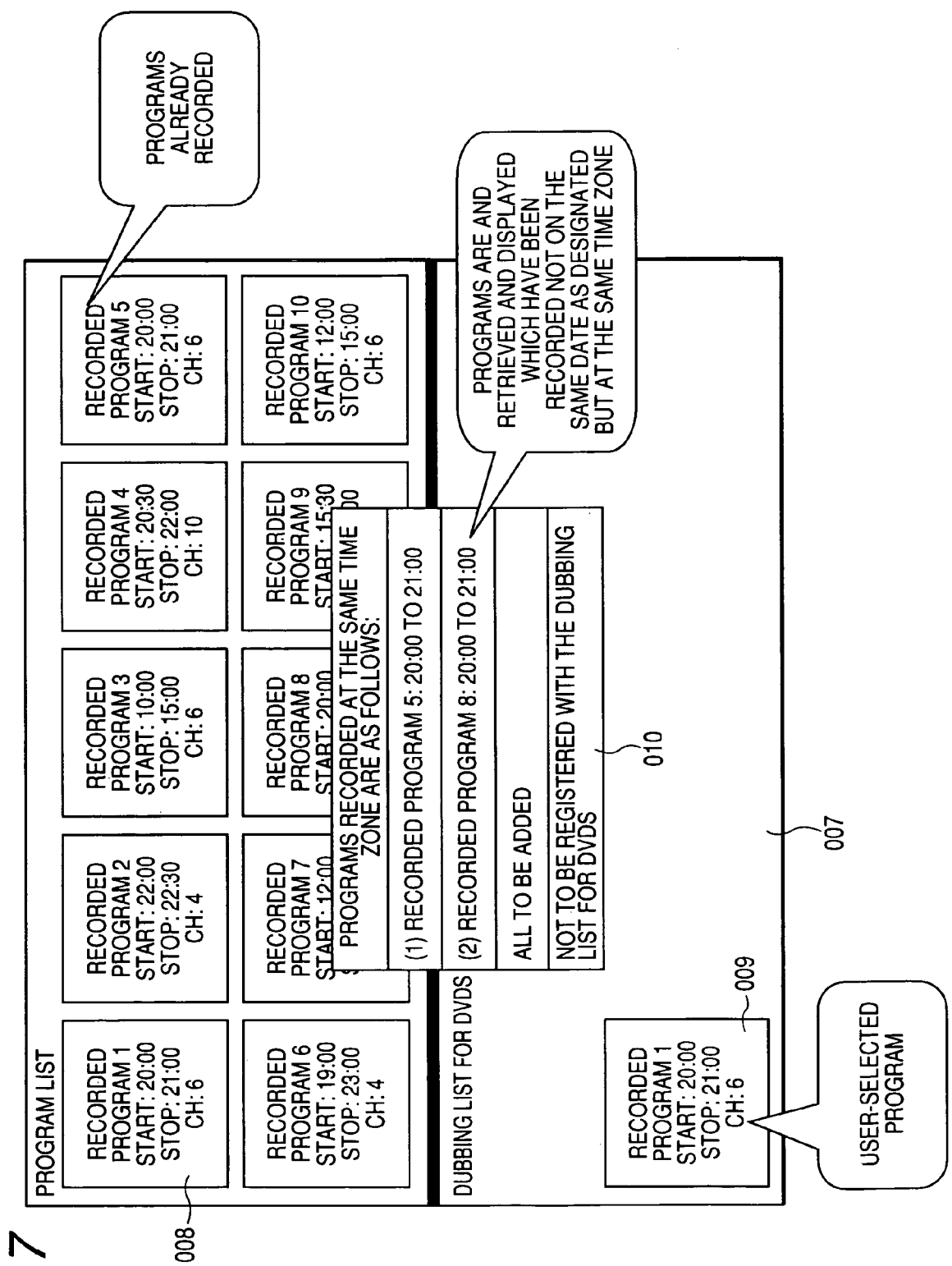
FIG. 7 is an imaginary diagram showing a program-selecting screen for dubbing a program to another recording medium.

FIG. 7 imaginarily shows a program-selecting screen (hereinafter referred to as a "dubbing-selecting screen) used for dubbing a program to another recording medium, according to the second embodiment. Reference numeral 007 denotes a TV screen display area and reference numeral 008 denotes programs already recorded. In FIG. 7, programs 1 to 10 are recorded and the associated information is displayed for each of the recorded programs 1 to 10. A region with then programs available is displayed as an HDD program list. Reference numeral 009 denotes a program selected by a user for dubbing to another recording medium. In this example, a recorded program 1 has been selected by a user. A region having these selected programs is displayed as a dubbing list used for dubbing to a DVD. A region designated with reference numeral 010 is displayed as a telop when the user selects a program to be dubbed to another recording medium. A recorded program meeting any of the conditions that the selected-recorded program has is displayed. These conditions will be described later. This telop can be used to select a recorded program meeting any of the selection conditions of the user-selected recorded program and cancellation of program selection.

Figure 8:
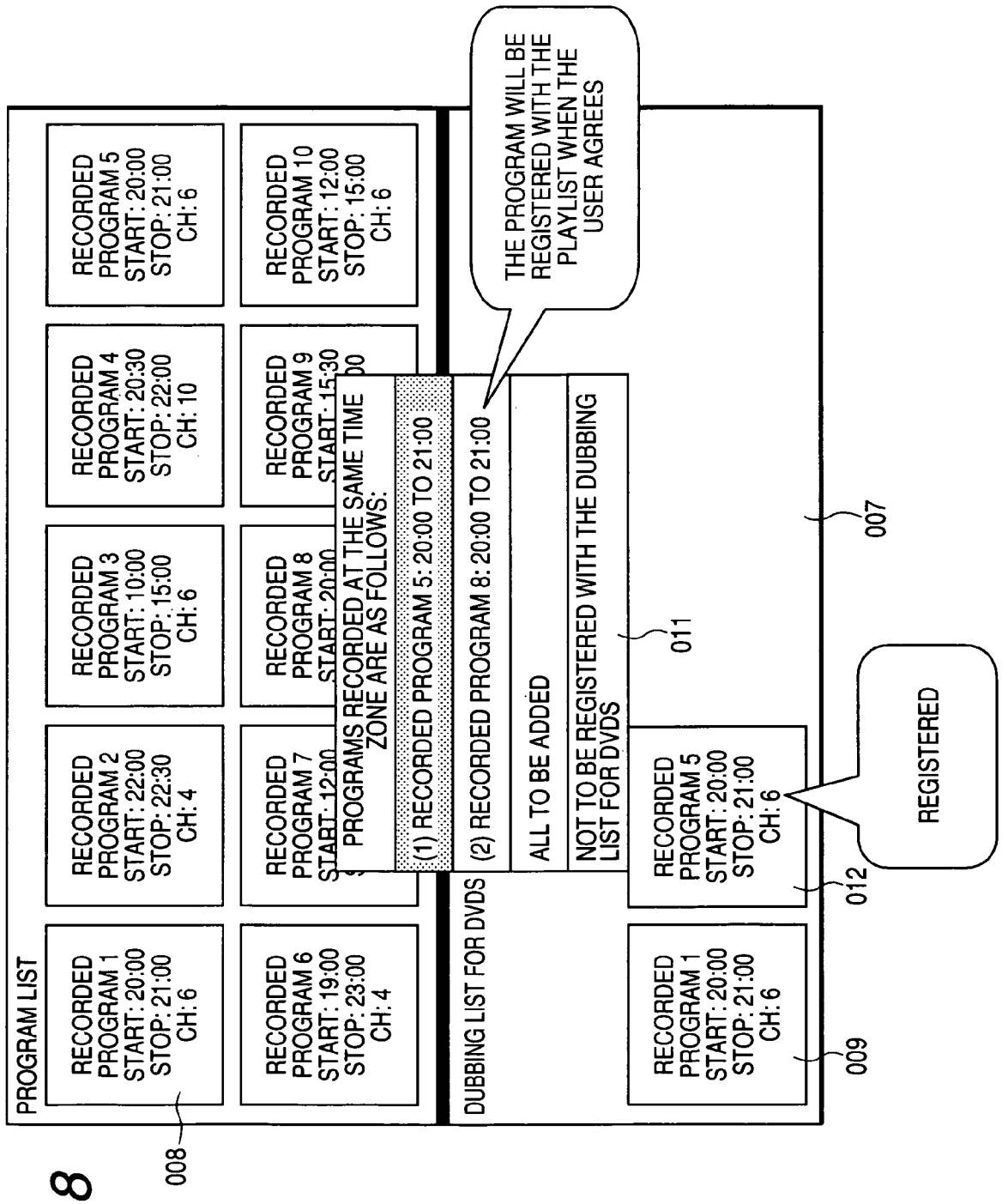
FIG. 8 is an imaginary diagram showing a dubbing list-selecting screen.

FIG. 8 shows another playlist-selecting screen according to the second embodiment. A region designated with reference numeral 011 corresponds to the telop shown in FIG. 7. This telop is used for the user to select a program to be registered with a dubbing list used for dubbing to a DVD. A region designated with reference numeral 012 displays a program selected from the telop 012 for addition to the dubbing list used for dubbing to a DVD.

A flow of the processing according to the second embodiment will be described below. It is assumed as a prerequisite that a user has recorded in a recording medium a plurality of programs obtained through various broadcastings such as ground-wave digital broadcasting and ground-casting analog broadcasting, and storage media such as DVDs. In addition, these programs are recorded together with the date of recording, time of recording start, time of recording end, and recorded program channel.

(1) The user selects a dubbing-selecting screen used for dubbing to another recording medium.

(2) The user selects a desired recorded program (recorded program 1 in FIG. 7) to be dubbed to another recording medium from a program list in the HDD program lists.

(3) The date of recording, time of recording start, time of recording end, and recording channel in the program selected by the user are each compared with those in other recorded programs. Programs having the same items except the date of recording are retrieved to thus pick up a recorded program that meets the above conditions.

(4) The program selected by the user is displayed on the dubbing list screen used for dubbing to a DVD and the program picked up at step (3) is displayed in a telop 010 as a candidate for dubbing to the DVD. Control unit can also rearrange the candidate for dubbing by any (or the other) conditions.

(5) The user selectively specifies a desired program from the telop 010 as shown in the telop 011.

(6) The recorded program selected from the telop 011 is added to the dubbing list screen used for dubbing to a DVD.

(7) Information on the programs other than the program selected from the telop 011 is then displayed again in a telop. Steps (5) to (7) are repeated until no retrieval result is displayed or until "Not to be registered with the dubbing list for DVDs" is selected because of no desired recorded programs in the retrieval result.

(8) The process then returns to the screen used for selecting a desired program from the HDD program list mentioned in step (2) and waits for the user's selection.

In the processing flow described above, a method has been described which uses the date of recording, time of recording start, time of recording end, and recording channel in the recorded program to select a program having the same condition as that of the program selected by the user among the recorded programs at step (3). However, the above program may be retrieved using the following information.

A title name of a recorded program: When the user records a desired program, its title name is also recorded. The user retrieves among the recorded programs a program having a title name with the same first few letters as those of the recorded program selected by the user for dubbing to a DVD, adopting the retrieved program as a candidate to be added to the dubbing list.

Series information on a recorded program: If information that the content of a program belongs to a series such as a sequel to a movie is added to a program stream recorded in various broadcastings or storage media, the information is recorded. When selecting a dubbing list used for dubbing to a DVD, the user retrieves a recorded program having the same series information as that of a program selected by the user among all the recorded programs, adopting the retrieved program as a candidate program to be added to the dubbing list.

Associated information that the user records along with a recorded program is the same as with the first embodiment. In addition, the recorded program may be dubbed to another recording medium with a small capacity. In this case, not all the recorded programs could be recorded because of the insufficient capacity if these programs are dubbed at the same dubbing rate therethrough. In such a case, the rate is calculated for each of the recorded programs picked up using user-selected recorded data and retrieval and the dubbing rate is optimized to be suited to the capacity of a recording medium for use in program dubbing. The aforementioned calculation of the dubbing rate is made based on the total recording time for the program selected by the user and the recorded program picked up through retrieval. In this case, the dubbing rate may also be determined considering the original recording rate.

Figure 9:
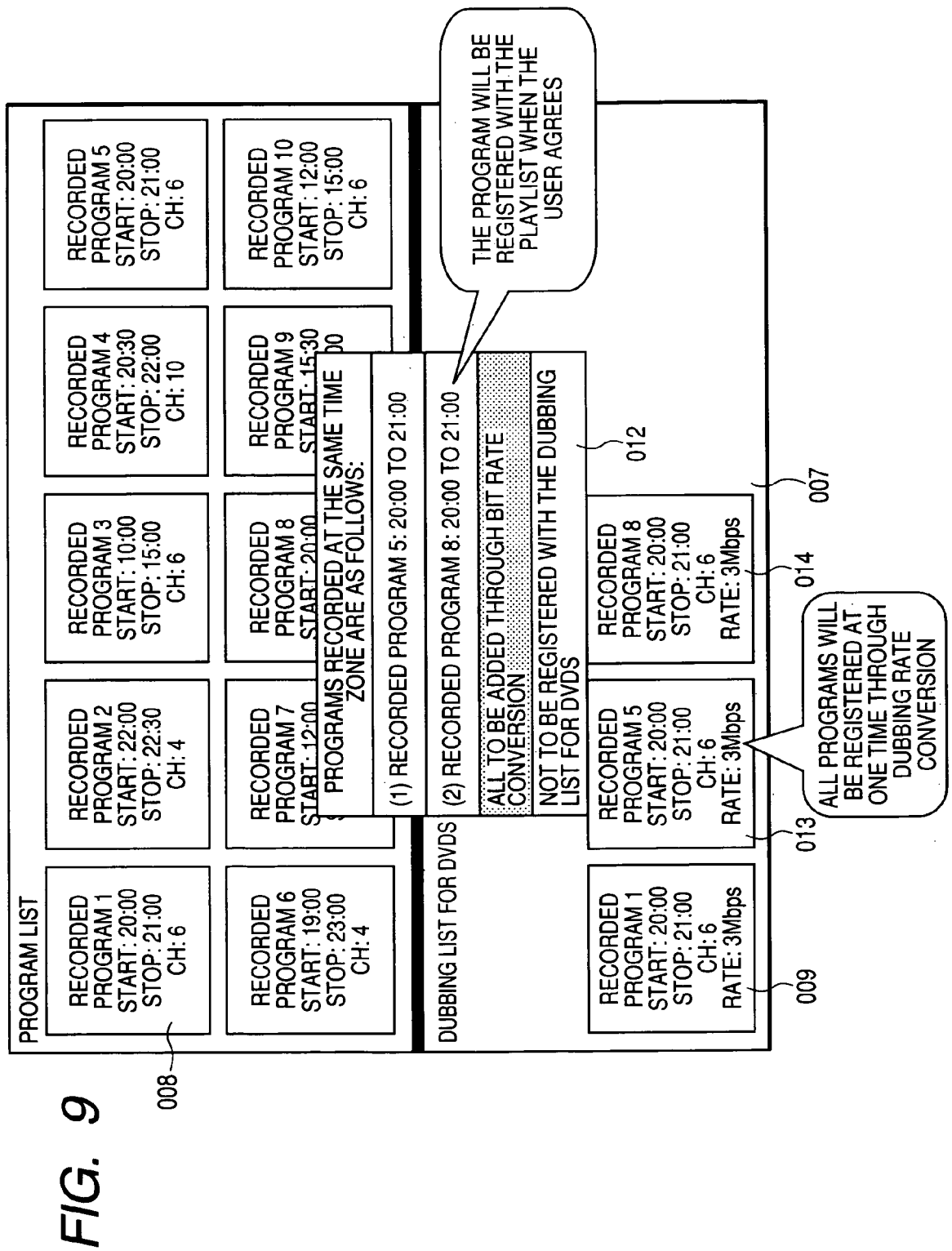
FIG. 9 is an imaginary diagram showing a dubbing list-selecting screen.

FIG. 9 imaginarily shows a selecting-screen used for optimizing the above dubbing rate. The rate is calculated in advance depending on the capacity of a recording medium for use in program dubbing between a user-selected recorded program and a program to be retrieved. When the user selects "All to be added through bit rate conversion" in the telop 012, both of the programs 013 and 014 are registered a one time with the dubbing list used for dubbing to a DVD. This allows recorded programs to be selected at a dubbing rate optimized, depending on the capacity of another recording medium, thus making it possible to reduce trouble with the user.

While we have shown and described several embodiments in accordance with our invention, it should be understood that disclosed embodiments are susceptible of changes and modifications without departing from the scope of the invention. Therefore, we do not intend to be bound by the details shown and described herein but intended to cover all such changes and modifications as fall within the ambit of the appended claims.

What is claimed is:

1. A digital image recording and reproducing apparatus connectable to a display module, said apparatus comprising:
   an output module which displays a plurality of digital images and a plurality of related information concerning said digital images recorded in a recording medium on the display module, each digital image corresponding to one of said plurality of related information; and
   a control module which selects a digital image to add in a playlist, based on one of the plurality of information concerning the digital image recorded in said recording medium;
   wherein for a selected digital image selected by the user, said control module;
     retrieves other digital images whose related information is the same as the selected digital image, the other digital images being candidates for adding in said playlist,
     outputs a list identifying the other digital images retrieved based on their related information to select another digital image to add in said playlist when said another digital image is selected from other digital images as the candidates by the user,
     outputs said playlist including a plurality of said digital images added, wherein said plurality of digital images, said plurality of related information, said list identifying the other digital images, and said playlist are outputted in a same display, and outputs one of the other digital images to be positioned next to another one of the other digital images in said list identifying the other digital images.

2. The digital image recording and reproduction apparatus according to claim 1, wherein said control module rearranges the information showing said selected digital image, based on related information concerning a digital image other than the related information concerning the digital image specified by the user and adds the rearranged information to said display module for display.

3. The digital image recording and reproduction apparatus according to claim 2, wherein said control module displays information concerning a digital image in which information showing said selected digital image is rearranged.

4. The digital image recording/reproduction apparatus according to claim 1, wherein a reduced image is displayed on said display module as the information showing the digital image selected by said control module.

5. The digital image recording and reproducing apparatus accordingly to claim 1, wherein for a selected digital image selected by the user, said control module outputs a telop to select another digital image from a plurality of the other digital images to add in said playlist when the telop is selected.

6. A method for creating a playlist designating an reproduction order for image data reproduced from a recording medium having a plurality of image data and associated information concerning said image data that are recorded thereon, said method comprising:
    listing the associated information concerning an image data recorded on said recording medium as a program list;
    receiving, from a user, selection of a desired image data to be registered with a playlist from said program list;
    retrieving an image data associated with associated information selected, from associated information concerning said selected image data;
    retrieving other image data whose related information is the same as the desired image data selected by the user, the other digital images being candidates for adding in said playlist;
    listing information identifying said other image data to select another digital image to add in said playlist when said another digital image is selected from other digital images as the candidates by the user;
    displaying said plurality of image data, said associated information, said listed information identifying the other image data, and said playlist including a plurality of said digital image data added in a same display; and
    displaying one of the other digital image data to be positioned next to another one of the other digital image data in said list identifying the other digital image data.

7. The method for creating a playlist according to claim 6, wherein said image data is a recorded program and information identifying said image information is a program title and/or a program time zone.

8. The method for creating a playlist according to claim 7, wherein said selecting-menu contains a selecting-menu used for registering all image data retrieved.

9. The method for creating a playlist according to claim 7, wherein a retrieval condition used in retrieving said selected image data is displayed.

10. The method for creating a playlist according to claim 7, wherein when information identifying said retrieved image data is added to a display, the information is rearranged for display based on associated information different from a retrieval condition used for the retrieval.

11. The method for creating a playlist according to claim 6, wherein when information identifying said retrieved image data is added to a display, the information is rearranged for display based on associated information different from a retrieval condition used for the retrieval.

12. A method for creating a playlist according to claim 6, wherein for a selected digital image selected by the user, displaying a selection menu including a telop to determine whether or not to register a plurality of said other image data to add in said playlist, when the telop is selected.

13. A dubbing list-creating method for selecting an image data in dubbing from a recording medium having a plurality of image data and associated information thereof that are recorded thereon to another recording medium, said method comprising:
    listing the associated information concerning an image data recorded on said recording medium as a program list;
    receiving, from a user, selection of desired image information to be registered with a dubbing list from said program list;
    retrieving image information associated with image information selected, from the associated information concerning the selected image data;
    retrieving other digital images whose related information is same as the one of the digital images selected from other digital images as the candidates by the user, the other digital images being candidates for adding in said playlist;
    listing information identifying the retrieved image information;
    displaying said plurality of image data said associated information, said listed information identifying said retrieved image information, and said dubbing list including a plurality of said digital image data added in a same display; and
    displaying one of the other digital image data to be positioned next to another one of the other digital image data in said list identifying the other digital image data.

14. The dubbing list-creating method according to claim 13, wherein said selecting menu includes a telop to determine a bit rate so as to registering all the retrieved image data.

15. The dubbing list-creating method according to claim 14, wherein the bit rate for said image data is determined based on a recordable capacity of said another recording medium on which dubbing is made.

16. A dubbing list creating method according to claim 13, wherein for a selected digital image selected by the user, displaying a selection menu including a telop to determine whether or not to register a plurality of said retrieved images to add in said dubbing list when the telop is selected.

* * * * *